(12) United States Patent
Nishiyama et al.

(10) Patent No.: US 6,300,015 B1
(45) Date of Patent: Oct. 9, 2001

(54) PROTON CONDUCTIVE POLYMER BATTERY AND METHOD OF FORMING THE SAME

(75) Inventors: Toshihiko Nishiyama; Gaku Harada; Shinako Okada; Masaki Fuziwara, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/285,795

(22) Filed: Apr. 5, 1999

(30) Foreign Application Priority Data

Apr. 3, 1998 (JP) ................................. 10-091519

(51) Int. Cl.[7] ............................ H01M 6/14; H01M 4/60; H01M 4/62
(52) U.S. Cl. .................... 429/303; 429/212; 429/213; 429/214; 429/215; 429/216; 429/217
(58) Field of Search ................... 429/212, 213, 429/214, 215, 216, 217, 303

(56) References Cited

U.S. PATENT DOCUMENTS

| | | | |
|---|---|---|---|
| 4,801,195 | * 1/1989 | Kawai et al. ........................ | 350/357 |
| 5,002,700 | 3/1991 | Otagawa et al. ..................... | 252/500 |
| 5,023,149 | * 6/1991 | MacDiarmid et al. ................ | 429/27 |
| 5,454,147 | * 10/1995 | Kobayashi et al. .................. | 29/25.03 |
| 5,473,503 | * 12/1995 | Sakata et al. ........................ | 361/525 |
| 5,756,230 | * 5/1998 | Gao et al. ............................ | 429/192 |
| 5,798,905 | * 8/1998 | Nishiyama et al. .................. | 361/504 |
| 6,099,989 | * 8/2000 | Harada et al. ....................... | 429/213 |

FOREIGN PATENT DOCUMENTS

| | | |
|---|---|---|
| 0 108 954 | 5/1984 | (EP) . |
| 2 124 635 | 2/1984 | (GB) . |

* cited by examiner

Primary Examiner—Steven P. Griffin
Assistant Examiner—Jonas N. Strickland
(74) Attorney, Agent, or Firm—Young & Thompson

(57) ABSTRACT

The present invention provides a positive electrode active material doped with a dopant comprising an anion having the same or similar molecular structure to a polymer matrix of at least one of a solid electrolyte and a gel solid electrolyte.

23 Claims, 14 Drawing Sheets

PROTON CONDUCTIVE POLYMER BATTERY AND METHOD OF FORMING THE SAME

BACKGROUND OF THE INVENTION

The present invention relates to a polymer battery having electrodes for fetching electrical energy due to electron transfers in oxidation-reduction reaction of compound and either a solid electrolyte or a gel-solid electrolyte, and a method of forming the same.

FIG. 1 is a cross sectional elevation view illustrative of a structure of a conventional proton conductive polymer battery. The conventional proton conductive polymer battery has a positive electrode 102 on a positive collector 101, and a negative electrode 104 on a negative collector 103 as well as a separator through which the positive electrode 102 and the negative electrode 104 are combined with each other. FIG. 2 is a cross sectional elevation view illustrative of a conventional structure of the positive electrode on the positive collector. A positive electrode 102 is provided on a positive collector 101. The positive electrode 102 comprises a positive electrode active material 106 and an electrically conductive material 107 as well as an electrolyte solution 108 into which the positive electrode active material 106 and the electrically conductive material 107 are immersed. A carbon black is available for the electrically conductive material 107. The positive electrode active material 106 comprises such a polymer that only absorption and desorption of proton contribute to an oxidation-reduction reaction. The positive electrode active material 106 is doped with a dopant for allowing the polymer of the positive electrode active material 106 to exhibit an electrical conductivity. Both organic compounds and inorganic compounds are available for the dopant to be doped into the positive electrode active material 106. The kinds of the available dopants are unlimited unless the doping is difficult. Solutions and non-solutions containing proton source materials are available for the electrolyte solution 108.

FIG. 3 is a cross sectional elevation view illustrative of a conventional structure of the negative electrode on the negative collector. A negative electrode 104 is provided on negative collector 103. The negative electrode 102 comprises a negative electrode active material 109 and an electrically conductive material 107 as well as an electrolyte solution 108 into which the negative electrode active material 109 and the electrically conductive material 107 are immersed. A carbon black is available for the electrically conductive material 107. The negative electrode active material 109 comprises such a polymer that only absorption and desorption of proton contribute to an oxidation-reduction reaction. The negative electrode active material 109 is doped with a dopant for allowing the polymer of the negative electrode active material 109 to exhibit an electrical conductivity. Both organic compounds and inorganic compounds are available for the dopant to be doped into the negative electrode active material 109. The kinds of the available dopants are unlimited unless the doping is difficult. Solutions and non-solutions containing proton source materials are available for the electrolyte solution 108.

The conventional battery with the negative electrode active material of the nitrogen containing quinoid compound or derivatives thereof has the following disadvantages. First, the cyclic characteristics are lowered. Second, the capacitance is small. Third, the rapid charge and discharge are impossible. Fourth, the spontaneous discharge is caused. FIG. 4 is a cross sectional elevation view illustrative of an elution of the negative electrode active material into the electrolytic solution in the conventional battery.

SUMMARY OF THE INVENTION

Accordingly, it is an object of the present invention to provide a novel dopant to be doped into a positive electrode active material free from the above problems.

It is a further object of the present invention to provide a novel positive electrode active material free from the above problems.

It is a still further object of the present invention to provide a novel proton conductive polymer battery improved in cyclic characteristics.

It is yet a further object of the present invention to provide a novel proton conductive polymer battery with an increased capacitance.

It is a further more object of the present invention to provide a novel proton conductive polymer battery capable of rapid charge and discharge.

It is still more object of the present invention to provide a novel proton conductive polymer battery capable of suppressing spontaneous discharge.

The present invention provides a positive electrode active material doped with a dopant comprising an anion having the same or similar molecular structure as a polymer matrix of at least one of a solid electrolyte and a gel solid electrolyte.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DESCRIPTION OF THE PREFERRED EMBODIMENTS

Figure 1:
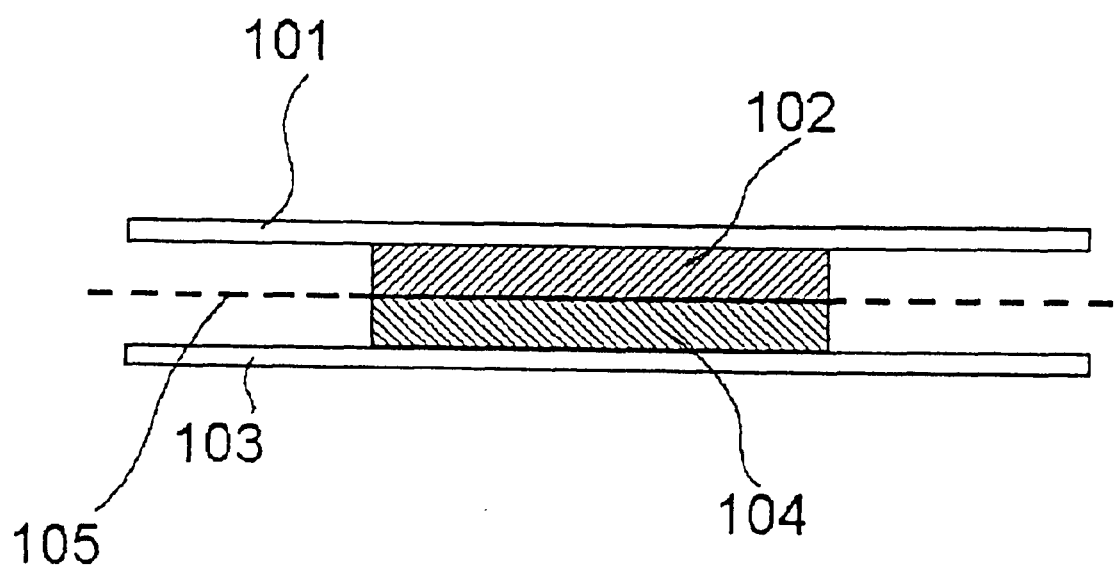
FIG. 1 is a cross sectional elevation view illustrative of a structure of a conventional proton conductive polymer battery.
Figure 2:
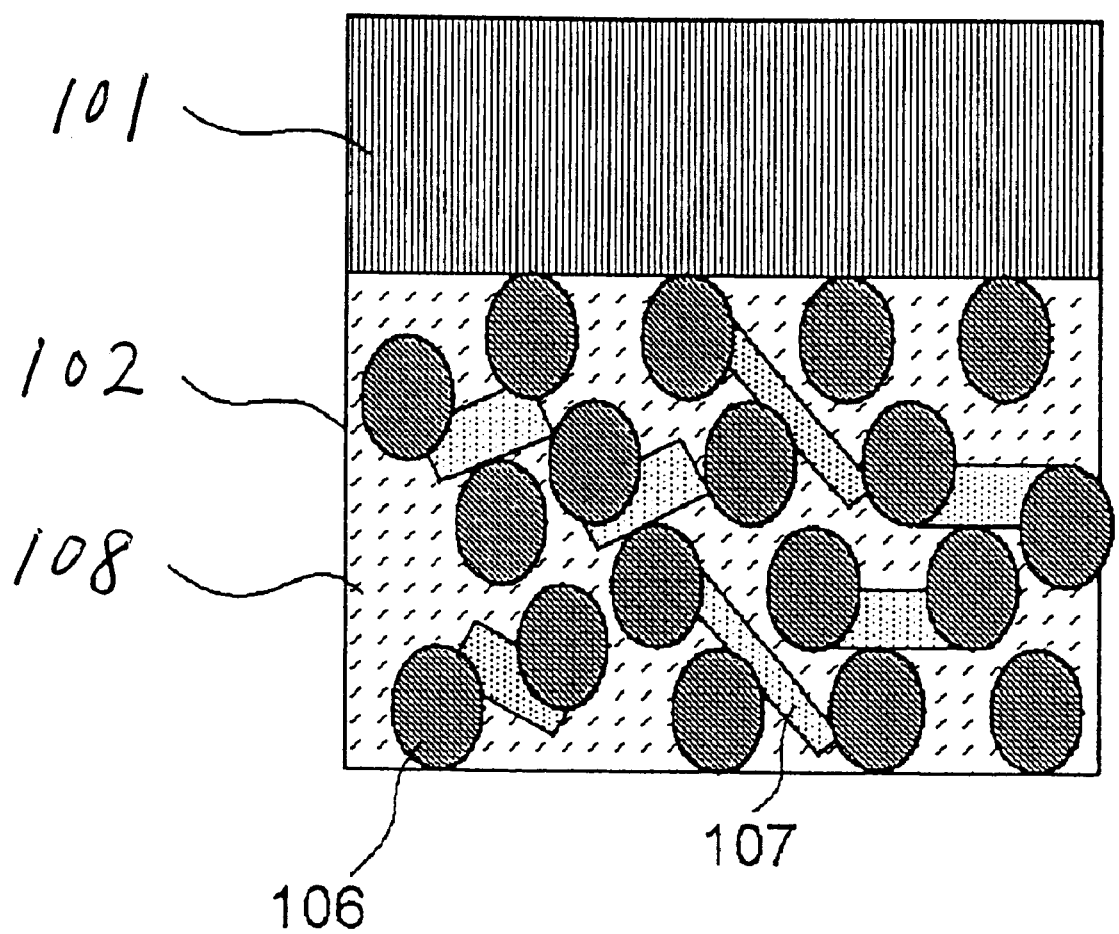
FIG. 2 is a cross sectional elevation view illustrative of a conventional structure of the positive electrode on the positive collector.
Figure 3:
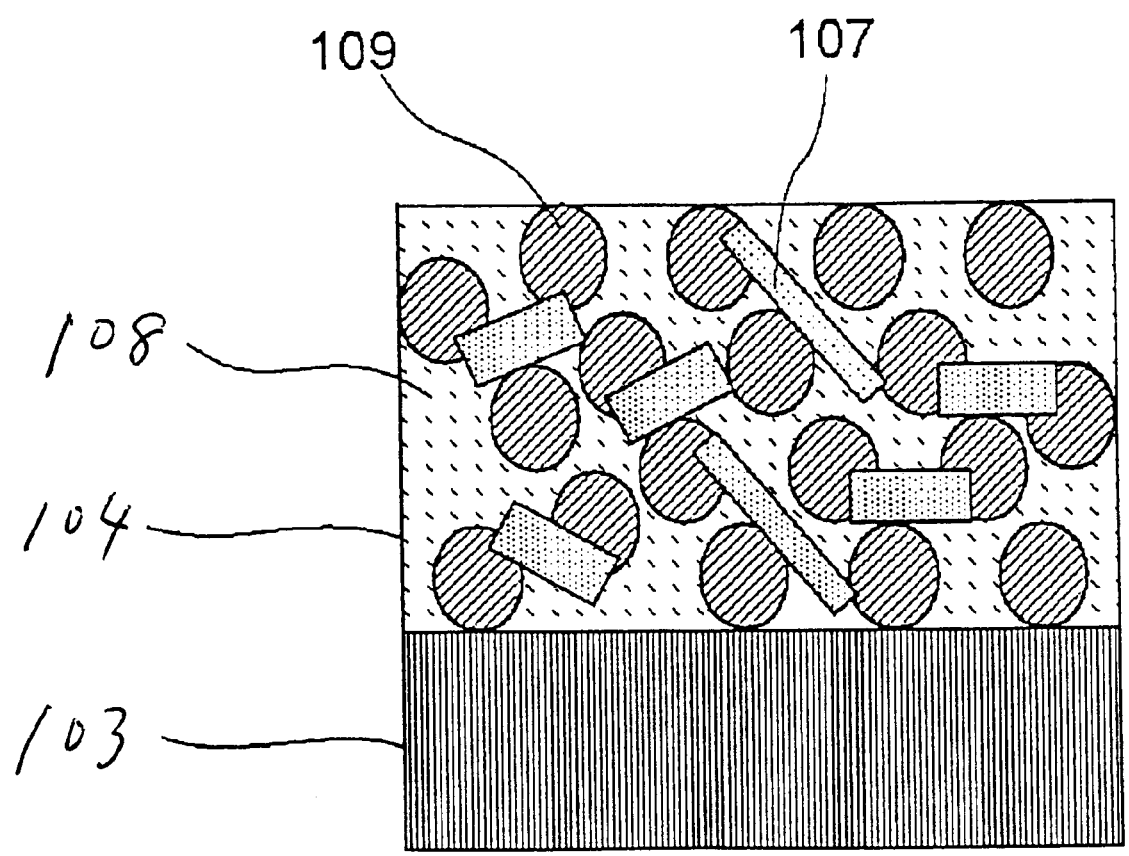
FIG. 3 is a cross sectional elevation view illustrative of a conventional structure of the negative electrode on the negative collector.
Figure 4:
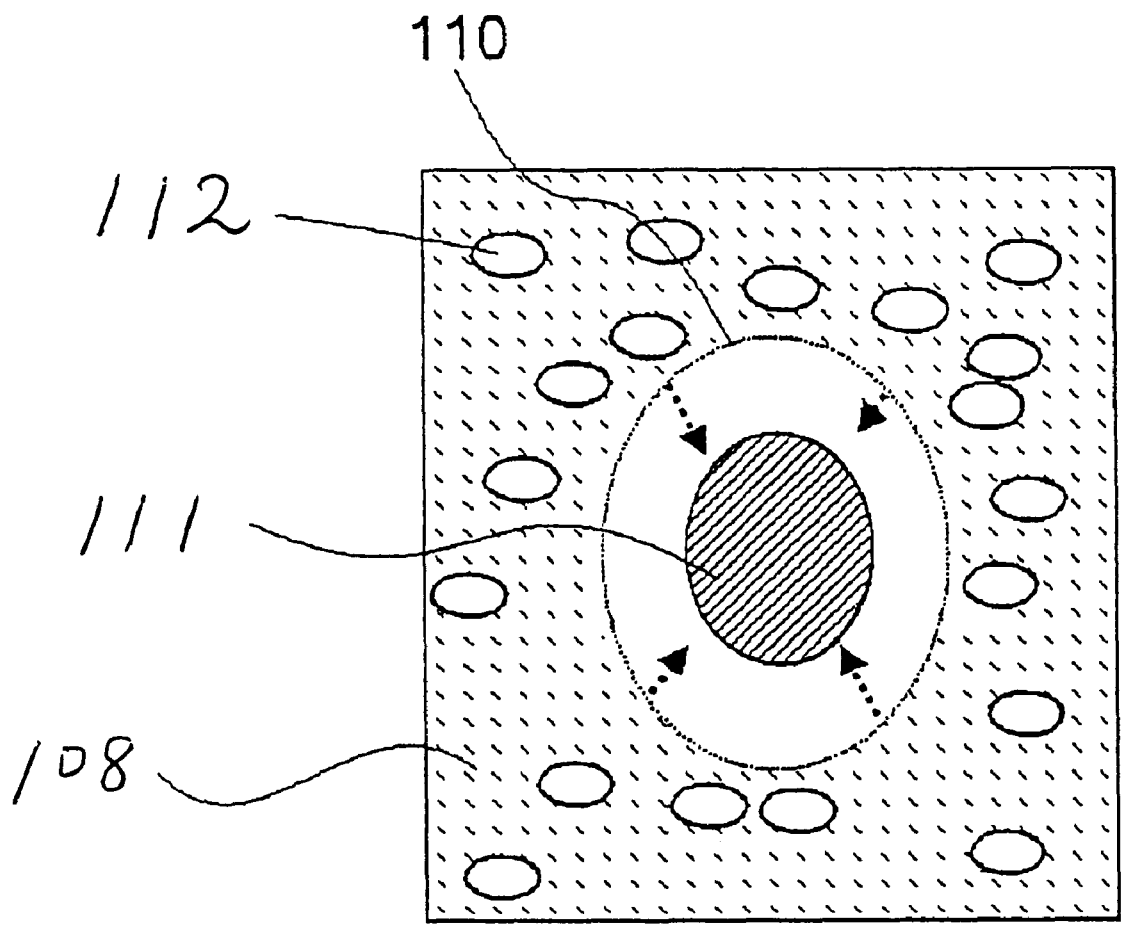
FIG. 4 is a cross sectional elevation view illustrative of an elution of the negative electrode active material into the electrolytic solution in the conventional battery.

The first aspect of the present invention provides a positive electrode active material doped with a dopant comprising an anion having the same or similar molecular structure as a polymer matrix of at least one of a solid electrolyte and a gel solid electrolyte.

It is preferable that the polymer matrix comprises one selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-methylpropanesulfonic acid and derivatives thereof.

It is also preferable that the dopant comprises one anion selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-mcthylpropanesulfonic acid and derivatives thereof.

It is also preferable that the positive electrode active material comprises a π-conjugated polymer including nitrogen atom.

It is also preferable that the π-conjugated polymer including nitrogen atom comprises one of polyaniline and derivatives thereof.

It is also preferable that the π-conjugated polymer including nitrogen atom comprises one of polyindole and derivatives thereof.

It is also preferable that the π-conjugated polymer including nitrogen atom comprises one of polymers having amino group and derivatives thereof.

It is also preferable that the positive electrode active material comprises a compound including nitrogen atom and having a quinoid structure.

It is also preferable that the compound including nitrogen atom and having a quinoid structure comprises a polymer having an aromatic ring in which at least a nitrogen atom is present.

It is also preferable that the polymer having the aromatic ring comprises a polymer selected from the group consisting of polypyrrole, polypyridinc, polypyrimidine, and derivatives thereof.

It is also preferable that the positive electrode active material composes a polymer compound having a hydroxyl group.

It is also preferable that the polymer compound having a hydroxyl group comprises a quinone compound derivative.

It is also preferable that the quinone compound derivative comprises one selected from anthraquinone derivatives and benzoquinone derivatives.

It is also preferable that the positive electrode active material comprises one selected from the group consisting of polyaniline, polyindole, nitropolyaniline and polydiaminoanthraquinone.

The above novel positive electrode active material of the firsts aspect of the present invention is applicable to a positive electrode comprising: an electrolyte in one of a solid state consisting of a polymer matrix and a gel solid state consisting of the polymer matrix immersed with a solution; a conductive material in the solid electrolyte ; and the positive electrode active material in the electrolyte.

The above positive electrode is applicable to a proton conductive polymer battery comprising: a negative electrode on a negative collector; and a positive electrode on a positive collector and the positive electrode and the negative electrode being separated by a separator, wherein the positive electrode has a structure of the above positive electrode.

It is also preferable that the positive electrode active material of the positive electrode comprises one selected from the group consisting of polyaniline, polyindole, nitropolyaniline and polydiaminoanthraquinone, and a negative electrode active material of the negative material comprises one selected from the group consisting of polypyridine and polypyrimidine.

The following effects are obtained. First, the cyclic characteristics are improved. Second, the capacitance is increased. Third, the rapid charge and discharge are possible. Fourth, the spontaneous discharge is suppressed.

The second aspect of the present invention provides a positive electrode active material doped with a dopant comprising an anion providing the positive electrode active material with a high chemical affinity to a polymer matrix of at least one of a solid electrolyte and a gel solid electrolyte.

The above positive electrode active material of the seconds aspect of the present invention is applicable to a positive electrode which comprises: an electrolyte in one of a solid state consisting of a polymer matrix and a gel solid state consisting of the polymer matrix immersed with a solution; a conductive material in the solid electrolyte; and the positive electrode active material in the electrolyte.

The above positive electrode is also applicable to a proton conductive polymer battery comprising: a negative electrode on a negative collector; and the positive electrode on a positive collector and the positive electrode and the negative electrode being separated by a separator.

The following effects are obtained. First, the cyclic characteristics are improved. Second, the capacitance is increased. Third, the rapid charge and discharge are possible. Fourth, the spontaneous discharge is suppressed.

The above aspect of the present inventions will be described in more detail. A positive electrode active material is doped with a dopant comprising an anion having a high chemical affinity to a polymer matrix of one of a solid electrolyte and a gel solid electrolyte. The positive electrode active material is applicable to the following proton conductive polymer battery. The polymers to be used for the positive and negative electrode active materals of the battery are selected from the group consisting of π-conjugated polymers including nitrogen atom, compounds including nitrogen atom and having the quinoid structure, polymer compounds having hydroxyl group, in consideration of a difference in oxidation-reduction potential between the positive electrode active martial and the negative electrode active material. The nitrogen atom containing π-conjugated polymer may comprise one selected from the group consisting of polyaniline and derivatives thereof, polyindole and derivatives thereof, and polymers having amino group and derivatives thereof. The positive electrode active material comprises a compound including nitrogen atom and having a quinoid structure. The compound including nitrogen atom and having a quinoid structure may comprise a polymer having an aromatic ring in which at least a nitrogen atom is present. This polymer having the aromatic ring may comprise a polymer selected from the group consisting of polypyrrole, polypyridine, polypyrimidine, and derivatives thereof. Alternatively, the positive electrode active material may comprise a polymer compound having a hydroxyl group. This polymer compound having a hydroxyl group may comprise a quinone compound derivative. This quinone compound derivative may comprise one selected from anthraquinone derivatives and benzoquinone derivatives. The positive electrode active material comprises one selected from the group consisting of polyaniline, polyindole, nitropolyaniline and polydiaminoanthraquinone.

The proton conductive polymer battery utilizes an electrical energy caused by electron transfers in oxidation-reduction reactions of the positive electrode active martial and the negative electrode active material, wherein only proton bonded with or absorbed with nitrogen atom of the positive and negative electrode material contributes to the electron transfers or only proton of hydroxyl group in conjugation in the case of the quinine compounds.

The above positive and negative electrodes comprises the positive and negative electrode materials and the conductive material as well as the electrolyte in which the positive and negative electrode materials and the conductive material are immersed. The electrolyte is in a solid state or a gel solid state. The solid state electrolyte comprises a matrix like structure of polymers or a polymer matrix. The gel solid state electrolyte comprises a matrix like structure of polymers or a polymer matrix immersed in a solution such as an electrolyte solution. The polymer matrix comprises a substance which has a large chemical affinity with the positive electrode active material or has the same or similar molecular structure to an anion as a dopant as doped into the positive electrode active material. The polymer matrix may comprise a proton containing compound having a proton conductivity, for example, poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylaride-2-methylpropancsulfonic acid and derivatives thereof. One of the commercially available copolymers is, for example, a registered trademark "nafion®" which is commercially available from DuPont, herein after referred to as the copolymer.

In the electrolyte in the gel solid state, it may be possible to add a proton source material, for example, inorganic acids such as sulfuric acid, or organic acids such as polyvinyl sulfonic acid. Alternatively, it is also possible to add other salts for increasing the conductivity, for example, quatemary ammonium salts. The available proton source materials and salts to be added into the solid state electrolyte are not limited into particular substances but may, for example, be aqueous and non-aqueous solutions of acids such as a benzenesulfonic acid, a paratoluene sulfonic acid, benzenesulfonyl chloride, a dodecylbenzenesulfonic acid, a trifluoromethanesulfonic acid, a trifluoroacetic acid, a polyvinylsulfonic acid, a methanesulfonic acid, a trifluoromethanesulfonic acid, a 1-butanesulfonic acid, a 2,3,5-trichlorobenzenesulfonic acid, and a vinylphenylsulfonic acid. The increase in concentration of proton allows increase in output power of the polymer battery. However, the increase in concentration of proton causes a problem in elution of the negative electrode active material. This elution deteriorates a cyclic property of the polymer battery. It is necessary to select the solid state electrolyte or gel solid state electrolyte in accordance with the use of the polymer battery.

The dopant to be doped into the positive electrode active material comprises the anion which has the same or similar molecular structure to the polymer matrix of the solid state electrolyte or the gel solid state electrolyte, wherein the anion may correspond to such a substance that proton is excluded from the polymer matrix constituting the solid state electrolyte, whereby doping the positive electrode active material with the above dopant provides the positive electrode active material with a high affinity to the polymer matrix of the solid state electrolyte or the gel solid state electrolyte. The term "similar molecular structure" means, for example, to have the same functional group such as sulfonic group. The available doping rate, at which the above novel dopant is doped into the positive electrode active material, is, for example, not less than 30% and more preferably not less than 50%.

The above novel polymer battery in accordance with the present invention may be formed as follows, wherein polyaniline is the positive electrode active material, the copolymer is the dopant to be doped into the positive electrode active material, and polypyridine is the negative electrode active material.

The positive electrode may be formed as follows. Undoped polyaniline powders are produced by a chemical polymerization. An alcohol solution of a copolymer resin is then added into the undoped polyaniline powders and optionally heated for doping the copolymer into the polyaniline powders. The doped polyaniline powders are further added with a conductive material such as carbon powders and a binder resin as well as an appropriate solvent for mixing the same to form a slurry. This slurry is applied on a collector by a screen-printing method and then dried to form a thin film having a predetermined thickness on the collector, whereby the positive electrode is formed.

Alternatively, the following processes for the positive electrode are also available. The undoped polyaniline powders are added with the conductive material such as carbon powders and the binder resin as well as the suitable solvent for subsequent mixing the same to form the slurry. This slurry is coated on the collector thereby forming the positive electrode. This positive electrode is further vacuum-impregnated with above dopant-containing solution before a solvent is removed from the positive electrode whereby the dopant is doped into the positive electrode active material.

On the other hand, the negative electrode may be formed as follows. Polypyridine powders are produced by a chemical polymerization. The undoped polypyridinc powders arc then added with the conductive material such as the carbon powders and the binder resin as well as the suitable solvent for mixing the same to form a slurry. This slurry is then coated on the negative electrode collector by a suitable coating method such as a screen-printing method.

The positive and negative electrodes may optionally be subjected to an activation process for activating the positive and negative electrode active materials by applying a positive potential to the positive electrode active material and also applying a negative electrode to the negative electrode, before the positive and negative electrodes are combined through a separator.

The positive and negative electrodes mainly include the positive and negative electrodes, for example, at not less than 40%, and more preferably not less than 80%.

Whereas the above method utilizes the coating process, an electrolytic polymerization method is also available. The positive electrode may be formed by the electrolytic polymerization in a solution containing the above novel dopant, whereby the positive electrode material is doped with the dopant. If the use of only the positive electrode active material is sufficient to obtain the required conductivity and the formability of the electrode, the conductive material and the binder resin are not essential. The collectors already known are available, which are made of a polymer distributed with conductive materials such as platinum and carbon black or made of a glass carbon.

Solid state electrolyte layers are laminated on the positive and negative electrodes before the positive and negative electrodes are placed to sandwich a separator for subsequent heat treatment and pressure application so as to cause an osmosis of the solid electrolyte into the positive and negative electrode active materials, whereby the positive and negative electrodes are securely combined and the polymer battery is complicated. The separator may comprise an electrically insulating porous film such as a ceramic film, a glass film and various resin films.

Figure 5:
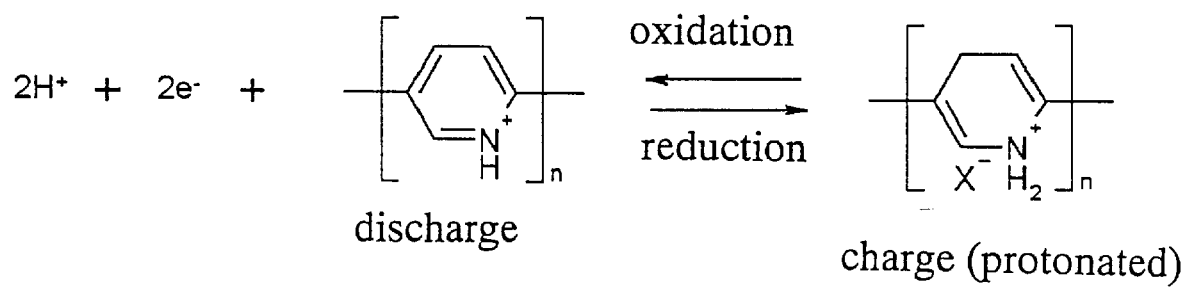
FIG. 5 is a view illustrative of the polymer battery charge/discharge mechanisms.

If the nitrogen containing quinoid compound is selected as the negative electrode active material, the polymer battery has charge/discharge mechanisms shown in FIG. 5. This nitrogen containing quinoid compound shows a protonation of nitrogen which is protonated with the anion in the electrolyte.

If the compound becomes soluble with the solution as the conventional battery, an elution may be caused of the active material or the nitrogen containing quinoid compound from the electrode over time. As a result, the amount of the active material in the electrode is reduced thereby the characteristic of the battery is deteriorated. For example, the capacity of the battery is reduced for every charge discharge cycles and also reduced by a spontaneous discharge in placing the battery.

If, however, in accordance with the present invention, the solid state electrolyte, in place of the liquid state electrolyte, then the compound is even protonated, whereby the solubility is zero or very low, for which reason the cyclic properties and the spontaneous discharge properties are improved.

Figure 6:
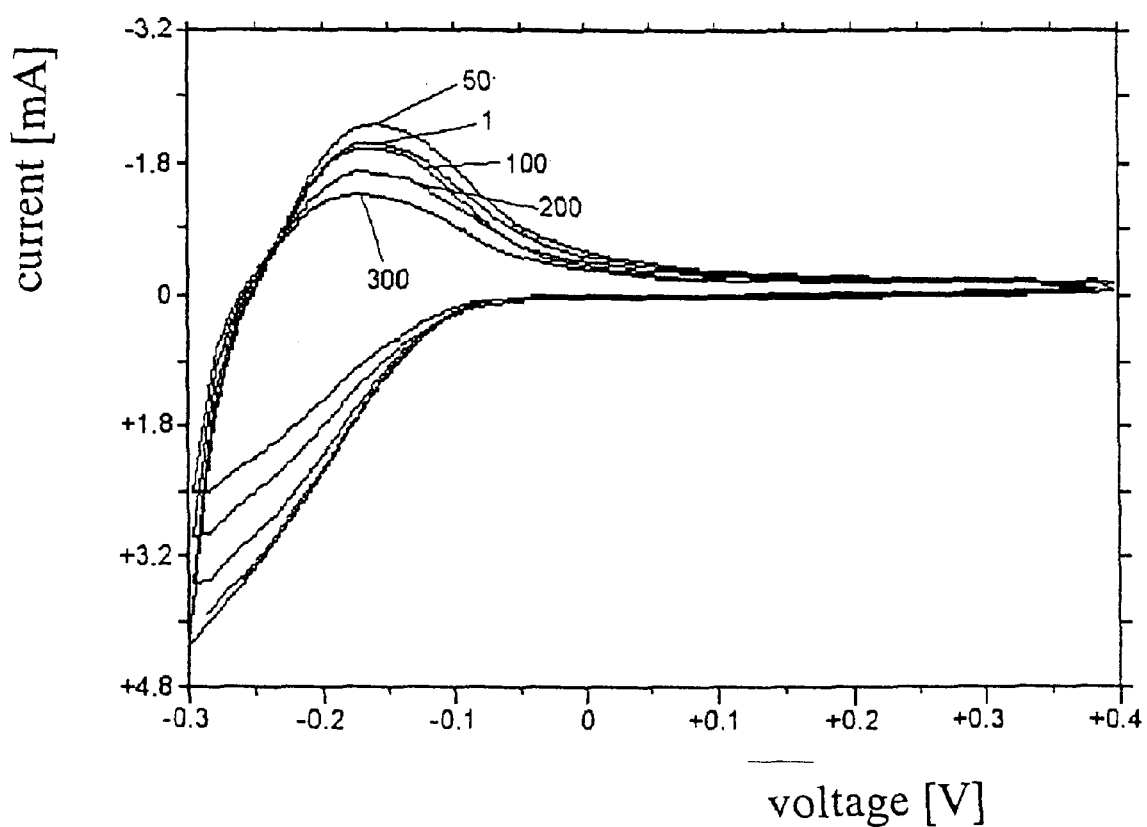
FIG. 6 is a diagram illustrative of differences current-voltage characteristics over cycles in a cyclic voltanometory measurement to the polypyridine as one kind of the nitrogen containing quinoid compounds in an electrolytic solution, for example, polyvinylsulfonic acid solution.

FIG. 6 is a diagram illustrative of differences current-voltage characteristics over cycles in a cyclic voltanometory measurement to the polypyridine as one kind of the nitrogen containing quinoid compounds in an electrolytic solution, for example, polyvinylsulfonic acid solution. For this measurement, the polypyridine is formed on the electrode, before a nafion® layer as the proton conductive solid state electrolyte is then formed so that the polypyridine is separated by the nafion layer from the electrolytic solution.

Figure 7:
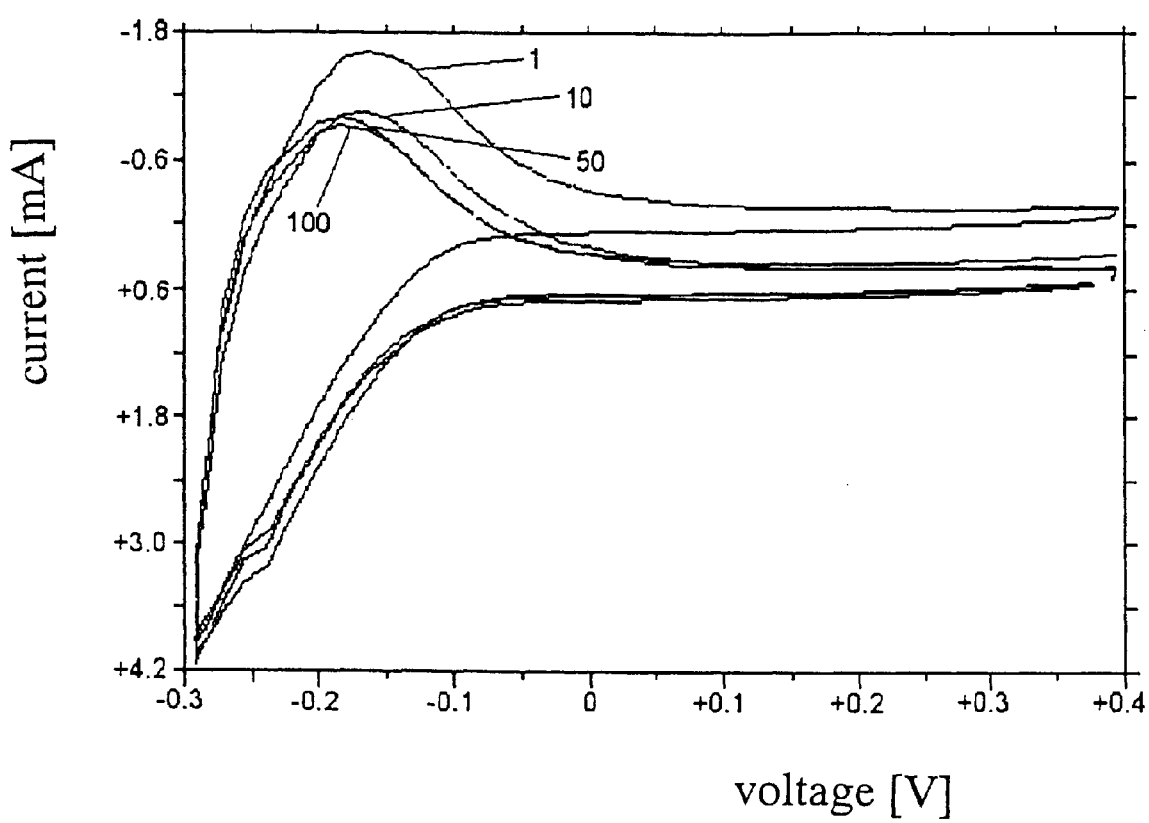
FIG. 7 is a diagram illustrative of differences current-voltage characteristics over cycles in a cyclic voltanometory measurement to the polypyridine as one kind of the nitrogen containing quinoid compounds in an electrolytic solution, for example, polyvinylsulfonic acid solution.

FIG. 7 is a diagram illustrative of differences current-voltage characteristics over cycles in a cyclic voltanometory measurement to the polypyridine as one kind of the nitrogen containing quinoid compounds in an electrolytic solution, for example, polyvinylsulfonic acid solution. For this measurement, the polypyridine is formed on the electrode but no nafion® layer as the proton conductive solid state electrolyte is then formed so that the polypyridine is in contact with the electrolytic solution.

As comparing FIG. 6 with FIG. 7, it is apparent that separation by the nafion® layer from the polypyridine from the electrolytic solution in FIG. 6 results in a large suppression of the reduction in reaction current by the potential scanning. Even the polypyridine is protonated and becomes soluble with the polyvinylsulfonic acid as the anion in the electrolytic solution, the solid state electrolyte layer, for example, the nafion® layer prevents elution into the electrolytic solution.

When the solid state electrolyte is used, this results in a large contact resistance between the electrode and the solid state electrolyte as compared to when the electrolyte solution is used because a contact area between the solid state electrode and the solid state electrolyte is smaller than a contact area between the solid state electrode and the liquid state electrolyte. The electrode active material shows an ion-exchange directly to the solid state electrolyte, for which reason a sufficiently large contact area between the electrode and the electrolyte is important.

If, contrary to the present invention, the contact area between the electrode and the electrolyte is small and the contact resistance is high, this means that an internal impedance of the battery is high. This means it difficult to carry out high speed charge or discharge operations.

If, in accordance with the present invention, the positive electrode active material is doped with the anion having the same or similar molecular structure to the polymer matrix of the solid state electrolyte so as to provide the positive electrode active material with an affinity to the solid state electrolyte, whereby the contact resistance between the positive electrode active material and the solid state electrolyte is reduced.

Figure 8:
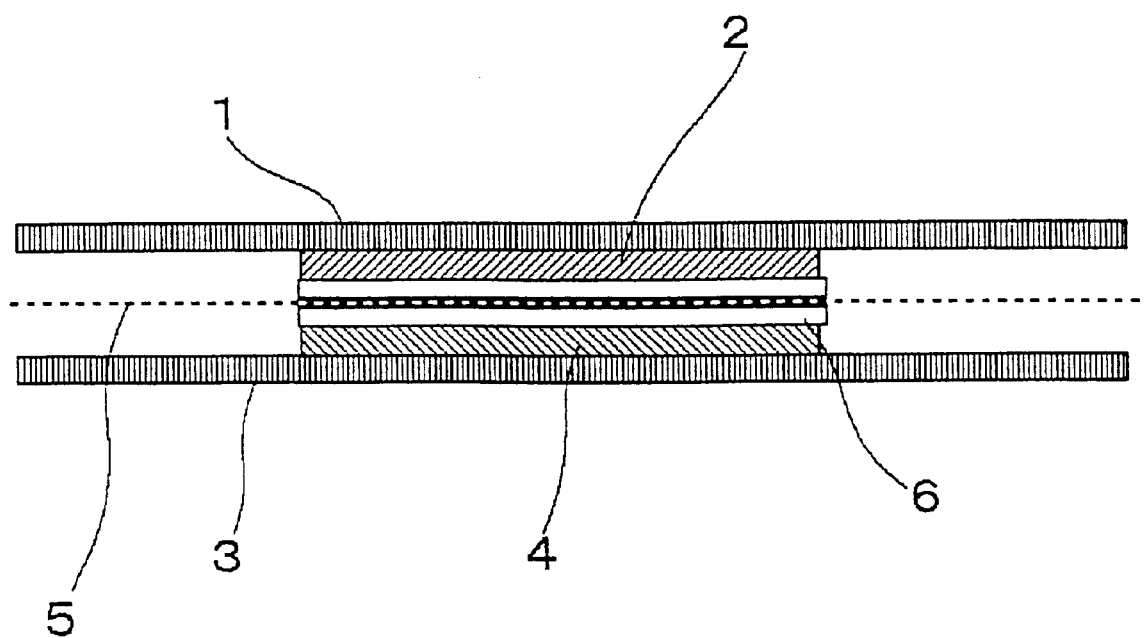
FIG. 8 is a cross sectional elevation view illustrative of a novel polymer battery, wherein a positive electrode active material is a doped polyaniline.

A first embodiment according to the present invention will be described in detail with reference to FIG. 8 which is a cross sectional elevation view illustrative of a novel polymer battery, wherein a positive electrode active material is a polyaniline doped with nafion®, herein after referred to as a doped polyaniline, whilst a negative electrode active material is polypyridine. Each of the positive and negative electrode active materials is in a form of a thin film having a thickness of 50 micrometers. Those positive and negative electrode active materials are formed on conductive films 6 as collectors 1 and 3. The solid state electrolyte films of nafion® are provided on the positive and negative electrode active materials. The positive and negative electrodes 2,4 are combined through a separator 5 which comprises a porous film which is electrically insulative and has an ion-permeability and a thickness of 25 micrometers.

Figure 9:
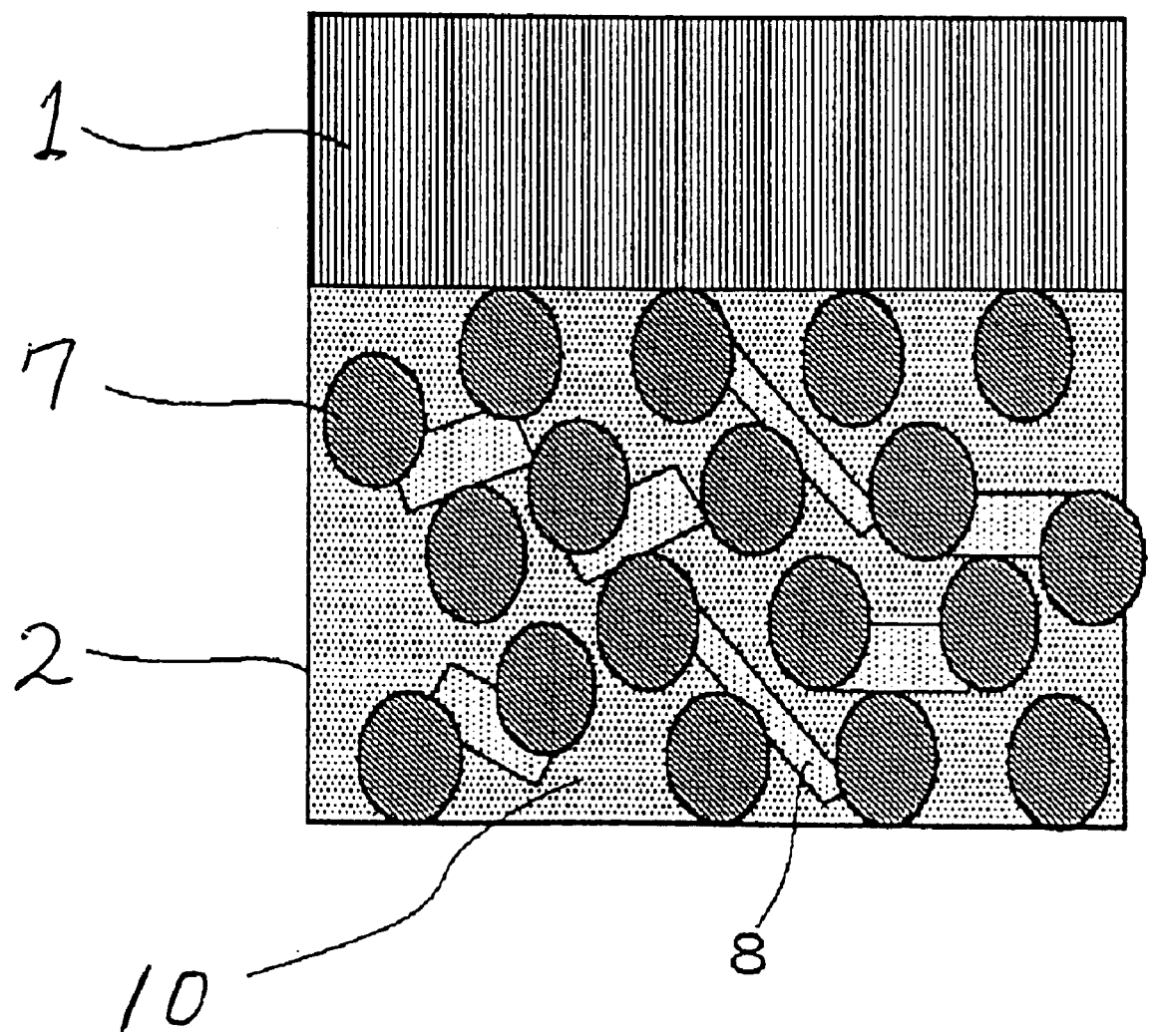
FIG. 9 is a fragmentary cross sectional elevation view illustrative of a positive electrode of the battery.

FIG. 9 is a fragmentary cross sectional elevation view illustrative of a positive electrode of the battery. The positive electrode 2 is provided on the positive electrode collector 1. The positive electrode comprises a positive electrode active material 7, a conductive material 8, and a solid state electrolyte 10 in which the positive electrode active material 7 and the conductive material 8 are immersed. The positive electrode active material 7 is doped with a novel dopant.

Figure 10:
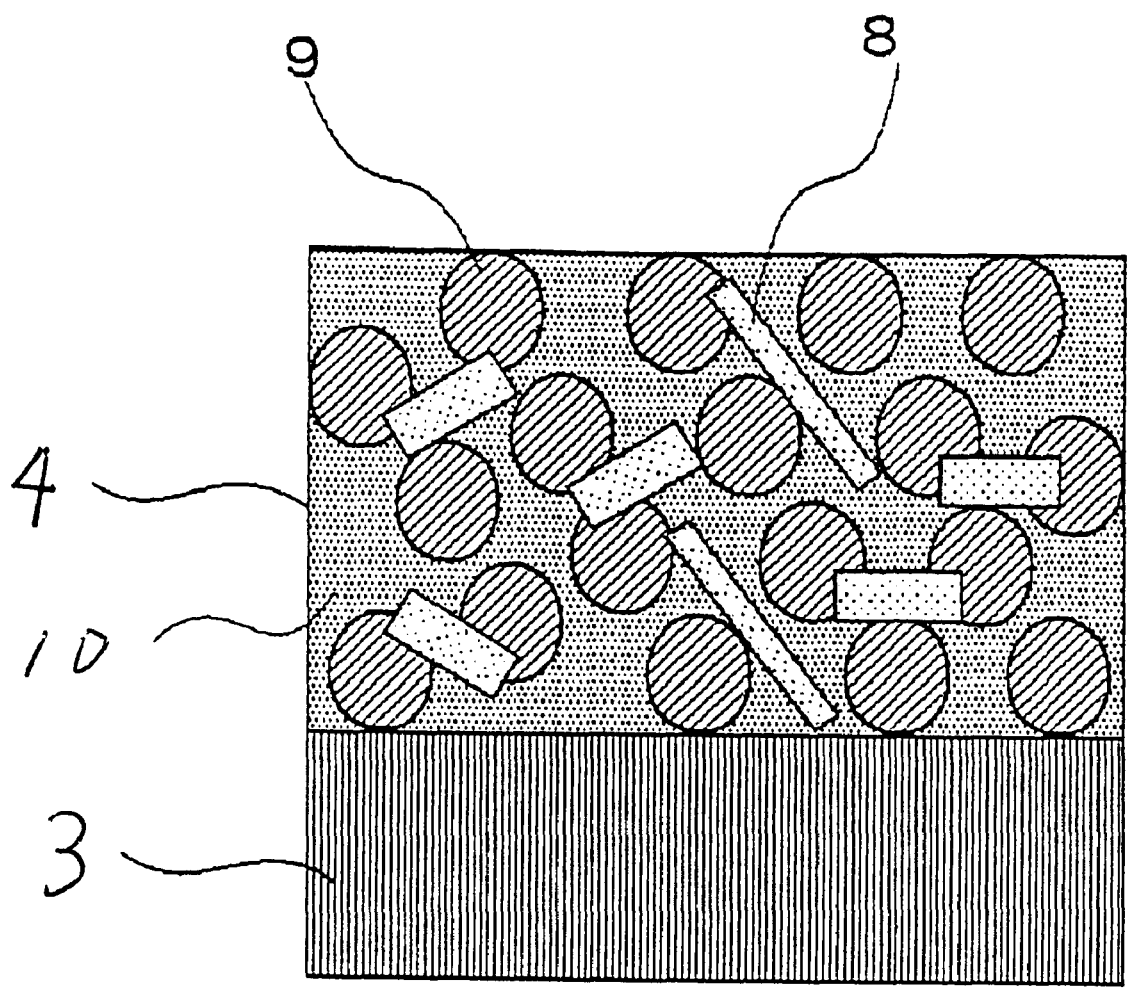
FIG. 10 is a fragmentary cross sectional elevation view illustrative of a negative electrode of the battery.

FIG. 10 is a fragmentary cross sectional elevation view illustrative of a negative electrode of the battery. The negative electrode 4 is provided on the negative electrode collector 3. The negative electrode comprises a negative electrode active material 9, a conductive material 8, and a solid state electrolyte 10 in which the negative electrode active material 9 and the conductive material 8 are immersed.

The above battery is formed by three steps, preparation of electrodes, pre-treatments and assembling the battery.

The positive and negative electrodes are formed as follows.

The positive electrode active material 7 is the nafion® doped polyaniline. Undoped polyaniline powders are prepared by a chemical polymerization. The undoped polyaniline powders are then added with a alcohol solution including nafion® at a concentration of 5% for subsequent placing the undoped polyaniline powders at 70° C. for 6 hours whereby the nafion® is doped into the polyaniline. The nafion® doped polyaniline powders are then cleaned and dried to obtain the positive electrode active material 7 doped with nafion® at 34%. 80 wt % of the nafion® doped polyaniline powders, 5 wt % of carbon powders as the conductive material and 15 wt % of polyvinylidene fluoride as a binder are added with a DMF solvent and mixed therewith to form a slurry. This slurry is then coated on the positive electrode collector 1 by a screen-printing method and then heated at 120° C. for 30 minutes to dry the same, thereby to form a positive electrode of 2×2 $cm^2$.

The negative electrode active material 9 is polypyridine. Polypyridine powders are prepared by a chemical polymerization. 80 wt % of the polypyridine powders, 5 wt % of carbon powders as the conductive material and 15 wt % of polyvinylidene fluoride as a binder are added with a DMF solvent and mixed therewith to form a slurry. This slurry is then coated on the negative electrode collector 3 by a screen-printing method and then heated at 120° C. for 30 minutes to dry the same, thereby to form a negative electrode of 2×2 $cm^2$.

Nafion® containing alcohol solution is dropped onto a glass plate to form two of a nafion® film having a thickness of 50 micrometers as the solid state electrolyte.

The pre-treatment to the electrode active materials are carried as follows.

Figure 11:
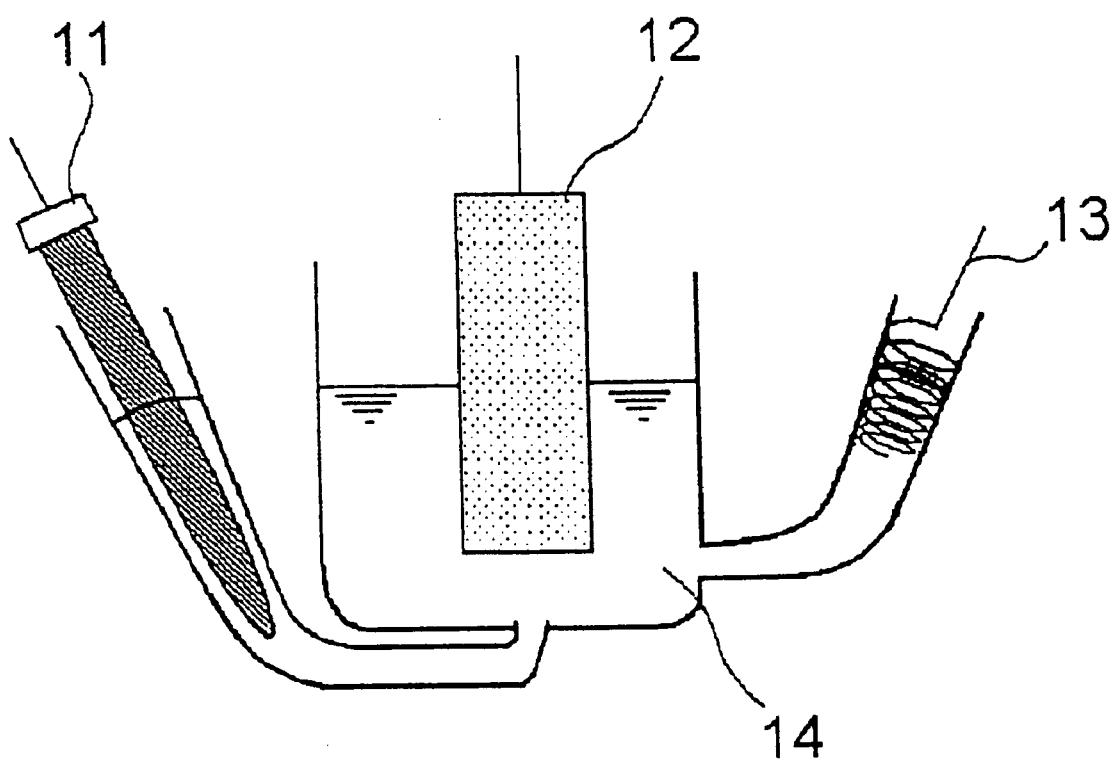
FIG. 11 is a schematic view illustrative of a measurement cell to be used for electrochemical characteristics of the electrode active materials.

FIG. 11 is a schematic view illustrative of a measurement cell to be used for electrochemical characteristics of the electrode active materials. 1 mol-PVSA solution 14 is used. A reference electrode 11 comprises a silver/silver chloride electrode. A working electrode 12 comprises a nafion® doped polyaniline electrode. An opposite electrode 13 comprises a platinum wire. By use of the measurement cell, the electrochemical characteristics of the nafion® doped polyaniline electrode 12 are confirmed.

Figure 12A:
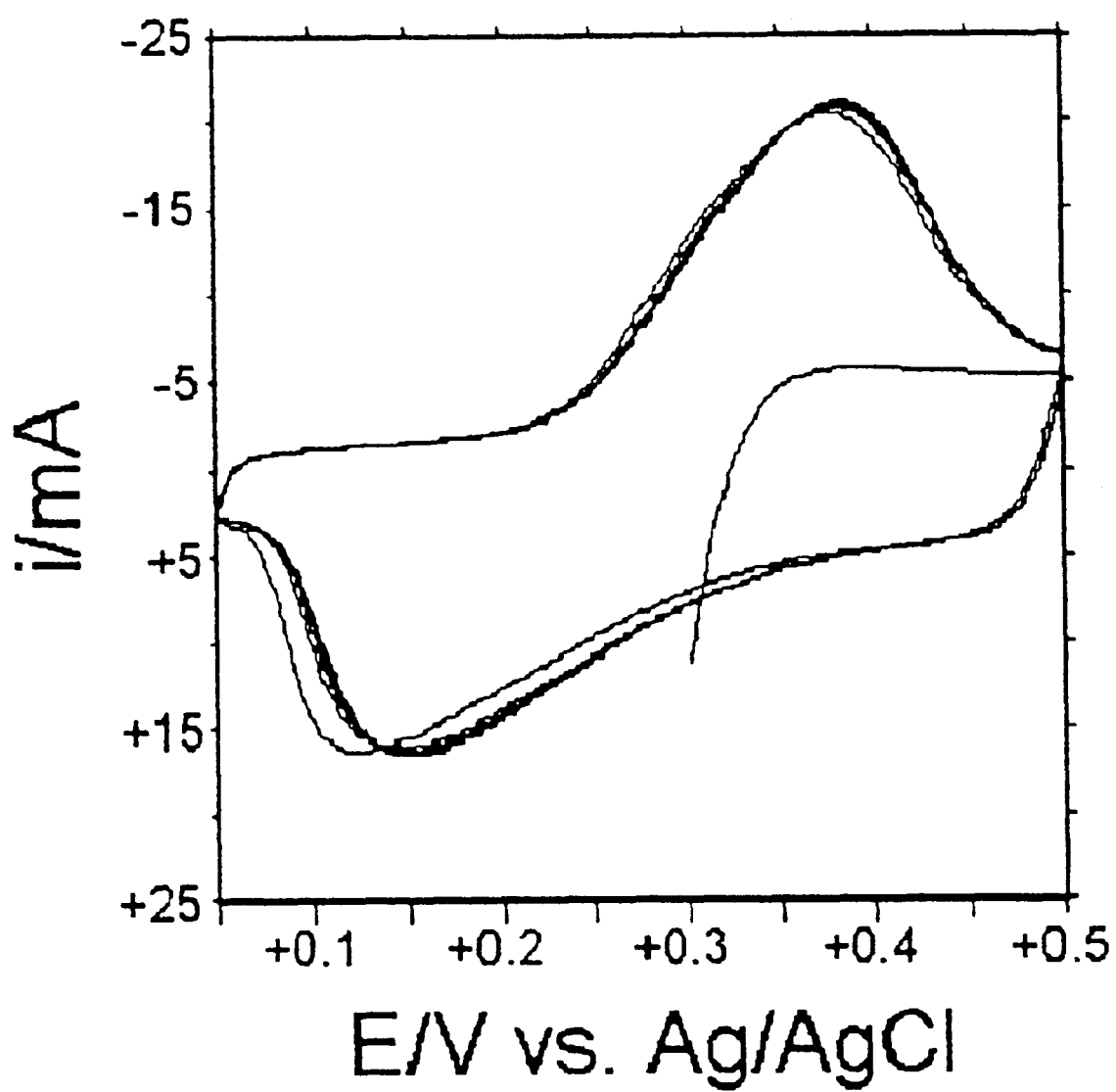
FIGS. 12A and 12B are diagrams illustrative of cyclic voltamograms of the nafion® doped polyaniline electrode measured by the measurement cell of FIG. 11.
Figure 12B:
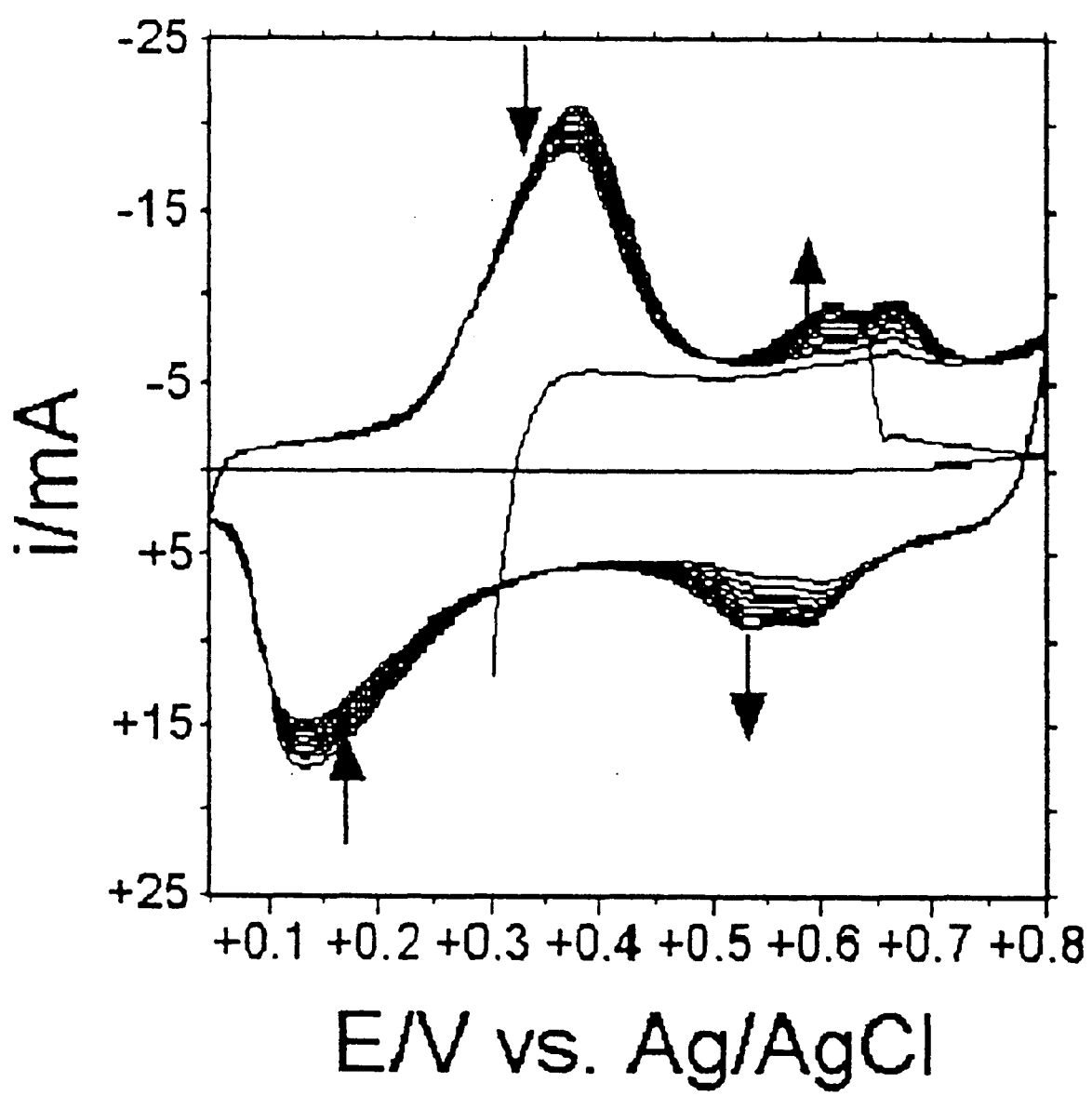

FIGS. 12A and 12B are diagrams illustrative of cyclic voltamograms of the nafion® doped polyaniline electrode measured by the measurement cell of FIG. 11. By use of the measurement cell of FIG. 11, a natural potential of the doped polyaniline electrode 12 is measured. The measured natural potential is about +0.35 V. With reference to the reference electrode 11, the potential is swept from the natural potential up to +0.5 V in oxidation side at a rate of 10 mV/sec., and subsequently the potential is swept up to +0.05 in the reduction side before the potential is again swept in the oxidation side. This potential sweeping operations are repeated in the range of +0.05V to +0.5V whereby the cyclic voltamogram of FIG. 12A is obtained. Further, with reference to the reference electrode 11, the potential is swept from the natural potential up to +0.8V in oxidation side at a rate of 10 mV/sec., and subsequently the potential is swept up to +0.05 in the reduction side before the potential is again swept in the oxidation side. This potential sweeping operations are repeated in the range of +0.05V to +0.8V whereby the cyclic voltamogram of FIG. 12B is obtained. In FIG. 12B, the reduction in the reduction side potential peak current by repeating the weeping operations is confirmed, wherein arrow marks show the reduction. This means that the oxidation-reduction reaction caused by a voltage of not less than +0.5V is irreversible reaction whereby the property of polyaniline is deteriorated. In this embodiment, the oxidation peak in the vicinity of +0.4V is used for charge to the positive electrode whilst the reduction peak in the vicinity of +0.1V is used as the charge to the negative electrode. Since this active material has the natural potential of +0.35 V, the commencement of charge from the natural potential may cause application of such a voltage to the positive electrode as to cause the irreversible reaction. Similarly to the polyaniline of the positive electrode, the negative electrode is also subjected to the potential sweeping operations in the range of –0.3V to +0.4V thereby the cyclic voltamograms of FIGS. 6 and 7 being obtained. Application of the lower voltage than –0.3V causes a hydrogen generation by electrolysis of water in the electrolytic solution, for which reason it is necessary to control the potential of the negative electrode from drop to –0.3 V or less. For those reasons, the electrode active materials are subjected to the following previous treatments in order to prevent that peroxidation of the positive electrode and hydrogen generation form the negative electrode. The measurement cell of FIG. 11 is used to apply +0.5V to the positive electrode and –0.3V to the negative electrode for 5 minutes for the previous treatments.

The battery is assembled as follows.

The above positive and negative electrodes are placed to sandwich the separator 9 for application of a pressure of 10 $kg/cm^3$ for 10 minutes at 100° C., whereby the solid electrolyte 10 is immersed into the positive and negative electrodes. As a result, the solid state electrolyte is made into contact with the positive electrode active material and the negative electrode active material.

Operations of the polymer battery of FIG. 8 will be described as follows.

Figure 13:
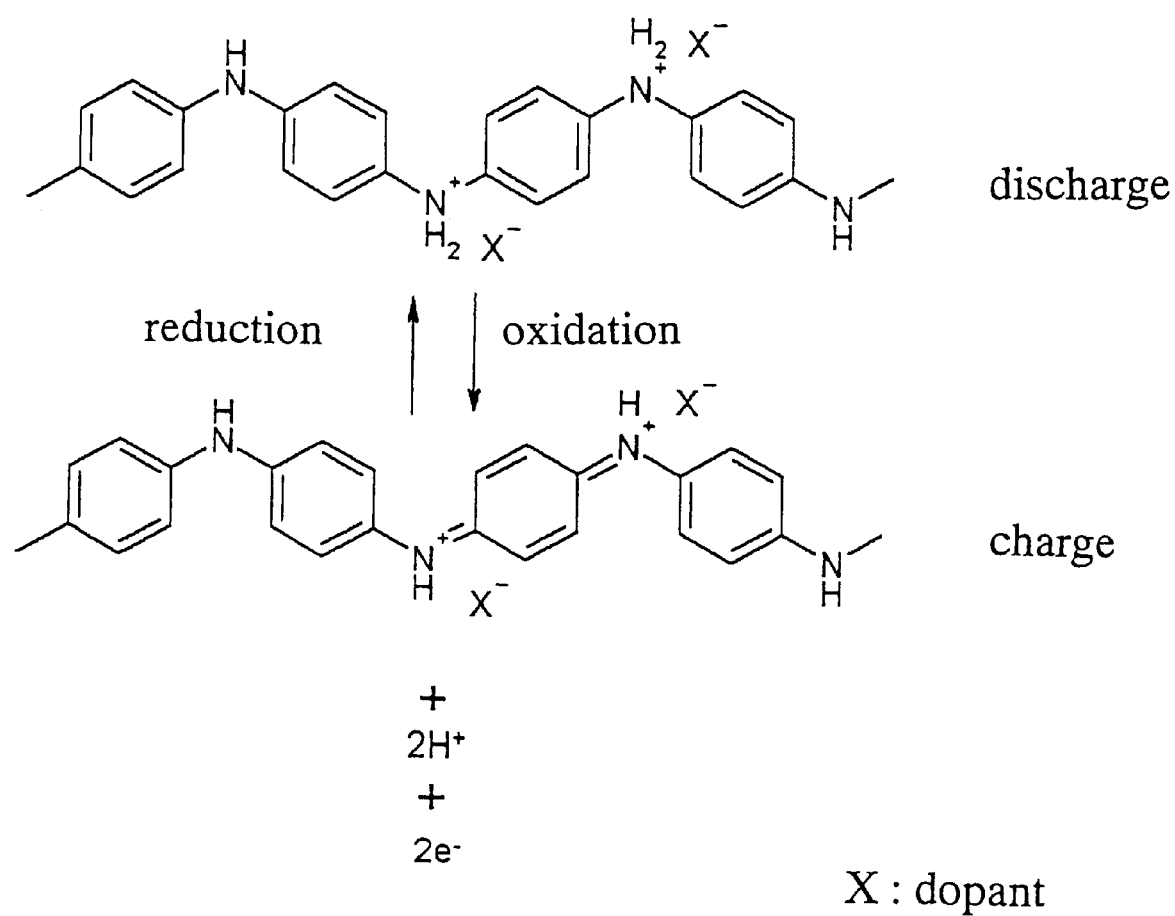
FIG. 13 is a view illustrative of charge discharge mechanisms of the battery having the positive electrode active material made of the nafion® doped polyaniline.

FIG. 13 is a view illustrative of charge discharge mechanisms of the battery having the positive electrode active material made of the nafion® doped polyaniline. The oxidation reaction of polyaniline extracts electrons from the nitrogen atoms of the polyaniline, whereby protons bonded or coordinated with the nitrogen atoms are eliminated and released to the electrolytic solution, whereby the aromatic structure of the polyaniline is changed o the quinoid structure. This oxidation reaction is the charge mechanism of the positive electrode active material. The reduction reaction of the polyaniline causes that the polyaniline receives electrons from the positive electrode collector, whereby protons in the electrolytic solution are absorbed to nitrogen atoms of the polyaniline, so that the quinoid structure of the polyaniline is changed to the aromatic structure. This reduction reaction is the discharge mechanism of the positive electrode active material.

The polyaniline in the aromatic structure is electrically insulative. However, the polyaniline is changed from the aromatic structure to the quinoid structure, this quinoid structured polyaniline shows the electron conductivity. Further oxidation of the polyaniline causes the anion in the electrolytic solution to be doped into the polyaniline whereby the polyaniline is again changed or returned to the electrically insulative state. However, as described above, this oxidation reaction in the solution is irreversible, for which reason if the second oxidation-reduction reaction is utilized, no desirable cyclic characteristics are obtainable. The present invention, however, does never utilize the irreversible second oxidation-reduction reaction but does utilize the reversible first oxidation reduction reaction, or the charge discharge mechanisms by absorption and desorption of proton with electron transfers of the active material.

FIG. 5 shows the oxidation reduction reaction mechanisms of the negative electrode. In charging the negative electrode, the nitrogen atoms of the polypyridine of the negative electrode active material is protonated. This reduction reaction is the charge mechanism of the negative electrode. The oxidation reaction is caused by elimination of proton from the protonated nitrogen atoms in the polypyridine. This oxidation reaction is the discharge mechanism of the negative electrode.

The polypyridine in oxidized state is insoluble with the acid solution. The protonated polypyridine in reduced state is soluble with the acid solution. For those reasons, if the electrolyte comprises an acid solution, cyclic charge discharge operations causes dissolution of the active material into the electrolytic solution, resulting in a deterioration in the cyclic characteristics of the battery. However, in accordance with the present invention, the electrolyte is the solid state to prevent dissolution of the protonated polypyridine.

In either the positive or negative electrode, the oxidation reduction reactions are caused by proton which is transferred from the electrolyte in contact directly with the electrode active material, for which reason it is very important to reduce the contact resistance between the electrode active material and the electrolyte. In this embodiment, the nafion® as the polymer matrix of the solid state electrolyte is also used as a dopant to be doped into the positive electrode active material, whereby the dopant is united with the electrolyte resulting in a reduction of the contact resistance between the positive electrode active material and the solid state electrolyte.

In order to evaluate the effects of the novel polymer battery of this embodiment, the followings measurements are carried out.

The cyclic characteristics of the discharge capacity are measured. The battery is charged at 0.9V for 30 minutes for subsequent discontinuation of charging operation for 5 minutes before the battery is discharged at 0.1C to drop the voltage to 0.6V. Those charge and discharge operations are set as one cycle. The discharge capacities for every cycles are measured. As a result, after 12000 cycles of the charge discharge operations, the discharge capacity is reduced to 80% of the initial discharge capacity.

The power characteristic of the battery is then measured. The battery is charged at 0.9V for 30 minutes for subsequent discontinuation of charging operation for 5 minutes before the battery is discharged under various conditions of 0.01C, 0.1C, 0.5C, 1C, and 10C. The measured discharge capacity in the discharge at 1C is 80% of the measured discharge capacity in the discharge at 0.1C. The measured discharge capacity in the discharge at 0.5C is 87% of the measured discharge capacity in the discharge at 0.1C.

The direct current internal impedance of the battery is measured.

The measured direct current internal impedance of the battery is 7 milliohms.

A second embodiment according to the present invention will be described. A structural difference of the battery of this embodiment from the first embodiment is only in the use of polypyrimidine for the negative electrode active material in place of polypyridine. The remaining structures are the same as the first embodiment.

An operational difference of the battery of this embodiment from the first embodiment is only in application of a charge voltage of 0.75V because the negative electrode reaction potential of polypyrimidine is higher by about 0.15V in oxidation side than polypyridine.

It is confirmed that other materials are also available as the negative electrode active material of the polymer battery.

A third embodiment according to the present invention will be described. A structural difference of the battery of this embodiment from the first embodiment is only in including trifluoroacetic acid ($CF_3COOH$) as proton source material into the nafion® as the solid state electrolyte. The trifluoroacetic acid ($CF_3COOH$) included in the solid state electrolyte is in contact with the negative electrode active material, for which reason the elution reaction of the negative electrode active material is suppressed whereby the deterioration in the cyclic characteristics of the battery is small. However, since the $CF_3COOH$ is included in the solid state electrolyte, the proton concentration of the solid state electrolyte is large, whereby the battery power or the discharge capacity ratio is larger than that of the first embodiment. Addition of the $CF_3COOH$ in the solid state electrolyte allows the enlargement in power of the battery even the cyclic characteristics are slightly deteriorated.

As a modification, in place of the $CF_3COOH$, it is also possible that a paratoluenesulfonic acid solution or $CF_3COOH$-propylene carbonate solution including proton source materials may be included into the electrolyte in order to obtain the same effects.

A fourth embodiment according to the present invention will be described. A difference of this embodiment from the first embodiment is only in the doping method of doping nafion® into the positive electrode active material. The positive electrode is prepared and then vacuum-impregnated with a nafion® containing alcohol solution before a alcohol is removed from the positive electrode whereby the nafion® as dopant is doped into the positive electrode active material, whereby an adhesion between the positive electrode active material and the solid state electrolyte is improved.

A fifth embodiment according to the present invention will be described. A structural difference of the battery of this embodiment from the first embodiment is only in the use of nitropolyaniline as the positive electrode active material. The remaining structures are the same as the first embodiment.

The negative electrode reaction potential of nitropolyaniline is higher by about +0.15V in oxidation side than polyaniline.

A sixth embodiment according to the present invention will be described. A structural difference of the battery of this embodiment from the first embodiment is only in the use of polydiaminoanthraquinone as the positive electrode active material. The remaining structures are the same as the first embodiment.

The negative electrode reaction potential of polydiaminoanthraquinone is higher by about +0.2V in oxidation side than polyaniline.

A seventh embodiment according to the present invention will he described. A structural difference of the battery of this embodiment from the first embodiment is only in the use of polystyrenesulfonic acid as the solid state electrolyte and also use of anion of polystyrenesulfonic acid as the dopant to be doped into the positive electrode active material. The remaining structures are the same as the first embodiment.

A first comparative embodiment will be described. A structural difference of the battery of this first comparative embodiment from the first embodiment is only in use of paratoluenesulfonic acid as a supporting salt of the electrolytic solution in place of the nafion® solid state electrolyte. Namely, the polyaniline positive electrode and the polypyridine negative electrode are placed in the 3 mol paratoluenesulfonic acid solution to sandwich the separator thereby forming the battery.

An operational difference of this the battery of this first comparative embodiment from the first embodiment is only in movement of proton through the paratoluenesulfonic acid solution. The electrolytic solution is directly contact with the negative electrode, for which reason in the charged state or the protonated state, an elution of polypyridine of the negative electrode active material into the electrolytic solution may be caused, resulting in a deterioration of the cyclic characteristics of the battery.

A second comparative embodiment will be described. A structural difference of the battery of this second comparative embodiment from the first embodiment is only in use of nafion® as the solid state electrolyte and PVSA as the dopant to be doped into the positive electrode active material.

The negative electrode is in contact with the solid state electrolyte, for which reason the elution of polypyridine is suppressed. However, the dopant of the positive electrode active material is different from the solid state electrolyte, for which reason a contact resistance between the positive electrode and the solid state electrolyte is large, whereby the internal impedance of the battery is also large and the power characteristic is also deteriorated.

A third comparative embodiment will be described. A structural difference of the battery of this third comparative embodiment from the first embodiment is only in use of both nafion® as the solid state electrolyte and PVSA as the electrolytic solution. The positive electrode and the negative electrode are prepared in the same manners as in the first embodiment. Only the negative electrode is compression-bonded with the nafion® layer and the positive and negative electrodes are placed to sandwich the separator in the 3 mol PVSA solution.

The negative electrode is in contact with the solid state electrolyte whereby the elution of polypyridine is suppressed, but a micro-defective portion of the nafion® layer may be formed through which the electrolytic solution is immersed into the negative electrode whereby the polypyridine of the negative electrode may be eluted over time. The cyclic characteristics are gradually deteriorated. On the other hand, the positive electrode is in contact with the electrolytic solution, for which reason proton is easily transferable between the positive electrode active material and the electrolytic solution. Since, however, the PVSA solution is included as the electrolytic solution, the leakage of the solution and dry up of the electrolytic solution are caused thereby the reliability is deteriorated.

TABLE 1

|  | Number of cycle | discharge capacity ratio | internal impedance |
| --- | --- | --- | --- |
| Ex. 1 | 12000 | 87% | 7 milliohms |
| Ex. 2 | 9000 | 82% | 11 milliohms |
| Ex. 3 | 7700 | 92% | 5 milliohms |
| Ex. 4 | 11000 | 78% | 14 milliohms |
| Ex. 5 | 11500 | 76% | 9 milliohms |
| Ex. 6 | 12000 | 87% | 6 milliohms |
| Ex. 7 | 9500 | 79% | 8 milliohms |
| Com. Ex. 1 | 15 | 52% | 970 milliohms |
| Com. Ex. 2 | 12000 | 69% | 21 milliohms |
| Com. Ex. 3 | 3200 | 65% | 820 milliohms |

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A positive electrode active material doped with a dopant comprising an anion having the same or similar molecular structure to a polymer matrix of at least one of a solid electrolyte and a gel solid electrolyte.

2. The positive electrode active material as claimed in claim 1, wherein said polymer matrix comprises one selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-methylpropanesulfonic acid and derivatives thereof.

3. The positive electrode active material as claimed in claim 1, wherein said dopant comprises one anion selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-methylpropanesulfonic acid and derivatives thereof.

4. The positive electrode active material as claimed in claim 1, wherein said positive electrode active material comprises a π-conjugated polymer including nitrogen atom.

5. The positive electrode active material as claimed in claim 4, wherein said π-conjugated polymer including nitrogen atom comprises one of polyaniline and derivatives thereof.

6. The positive electrode active material as claimed in claim 4, wherein said π-conjugated polymer including nitrogen atom comprises one of polyindole and derivatives thereof.

7. The positive electrode active material as claimed in claim 4, wherein said π-conjugated polymer including nitrogen atom comprises one of polymers having amino group and derivatives thereof.

8. The positive electrode active material as claimed in claim 1, wherein said positive electrode active material comprises a compound including nitrogen atom and having a quinoid structure.

9. The positive electrode active material as claimed in claim 8, wherein said compound including nitrogen atom and having a quinoid structure comprises a polymer having an aromatic ring in which at least a nitrogen atom is present.

10. The positive electrode active material as claimed in claim 9, wherein said polymer having said aromatic ring comprises a polymer selected from the group consisting of polypyrrole, polypyridine, polypyrimidine, and derivatives thereof.

11. The positive electrode active material as claimed in claim 1, wherein said positive electrode active material comprises a polymer compound having a hydroxyl group.

12. The positive electrode active material as claimed in claim 11, wherein said polymer compound having a hydroxyl group comprises a quinone compound derivative.

13. The positive electrode active material as claimed in claim 12, wherein said quinone compound derivative comprises one selected from anthraquinone derivatives and benzoquinone derivatives.

14. The positive electrode active material as claimed in claim 1, wherein said positive electrode active material comprises one selected from the group consisting of polyaniline, polyindole, nitropolyaniline and polydiaminoanthraquinone.

15. A positive electrode comprising:
an electrolyte in one of a solid state consisting of a polymer matrix and a gel solid state consisting of the polymer matrix immersed with a solution;

a conductive material in said electrolyte; and a positive electrode active material as claimed in claim 1 in said electrolyte.

16. A proton conductive polymer battery comprising:

a negative electrode on a negative collector; and a positive electrode on a positive collector, said positive electrode and said negative electrode being separated by a separator, wherein said positive electrode has a structure as claimed in claim 15.

17. The proton conductive polymer battery as claimed in claim 16, wherein said positive electrode active material of said positive electrode comprises one selected from the group consisting of polyaniline, polyindole, nitropolyaniline and polydiaminoanthraquinone, and a negative electrode active material of said negative electrode comprises one selected from the group consisting of polypyridine and polypyrimidine.

18. A positive electrode active material doped with a dopant comprising an anion providing the positive electrode active material with a high chemical affinity to a polymer matrix of at least one of a solid electrolyte and a gel solid electrolyte and having the same or similar molecular structure as said polymer.

19. The positive electrode active material as claimed in claim 18, wherein said polymer matrix comprises one selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-methylpropanesulfonic acid and derivatives thereof.

20. The positive electrode active material as claimed in claim 18, wherein said dopant comprises one anion selected from the group consisting of poly-styrene-divinylbenzene and derivatives thereof, copolymers of sulfonated vinylethersulfonyl fluoride and tetrafluoroethylene and derivatives thereof, a polystyrenesulfonic acid and derivatives thereof, and a poly-2-acrylamide-2-methylpropanesulfonic acid and derivatives thereof.

21. A positive electrode comprising:

an electrolyte in one of a solid state consisting of a polymer matrix and a gel solid state consisting of the polymer matrix immersed with a solution;

a conductive material in said electrolyte; and a positive electrode active material as claimed in claim 18 in said electrolyte.

22. A proton conductive polymer battery comprising:

a negative electrode on a negative collector; and a positive electrode on a positive collector, said positive electrode and said negative electrode being separated by a separator, wherein said positive electrode has a structure as claimed in claim 21.

23. The proton conductive polymer battery as claimed in claim 22, wherein said positive electrode active material of said positive electrode comprises one selected from the group consisting of polyaniline, polyindole, nitropolyaniline and polydiaminoanthraquinone, and a negative electrode active material of said negative electrode comprises one selected from the group consisting of polypyridine and polypyrimidine.

* * * * *